No. 863,309. PATENTED AUG. 13, 1907.
J. O'BRYAN.
MEASURING STICK.
APPLICATION FILED JAN. 31, 1907.
2 SHEETS—SHEET 2.
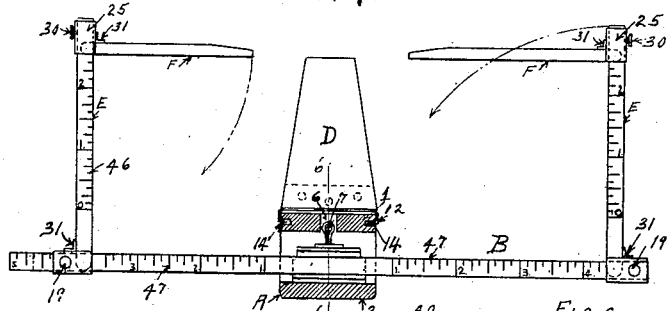
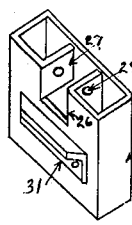
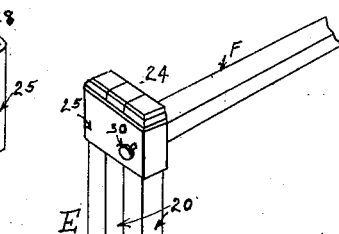
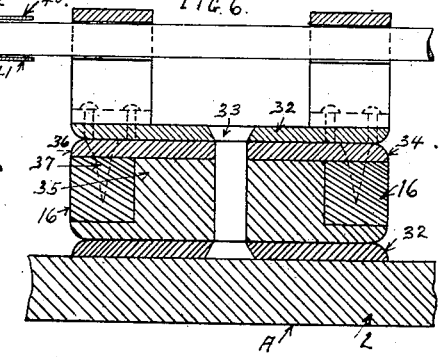
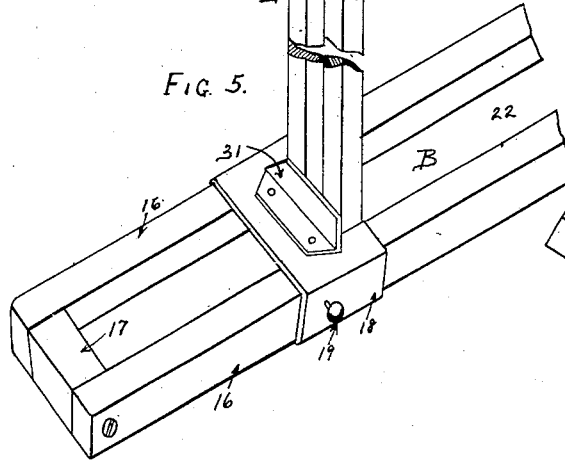
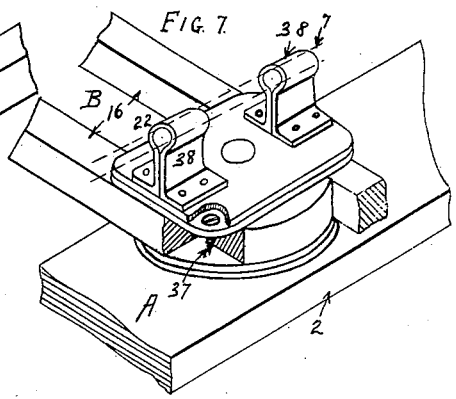
Witnesses
M. D. Phillips
M. R. Alfold
Joseph O'Bryan
Inventor
Joshua R. H. Potts
Attorney

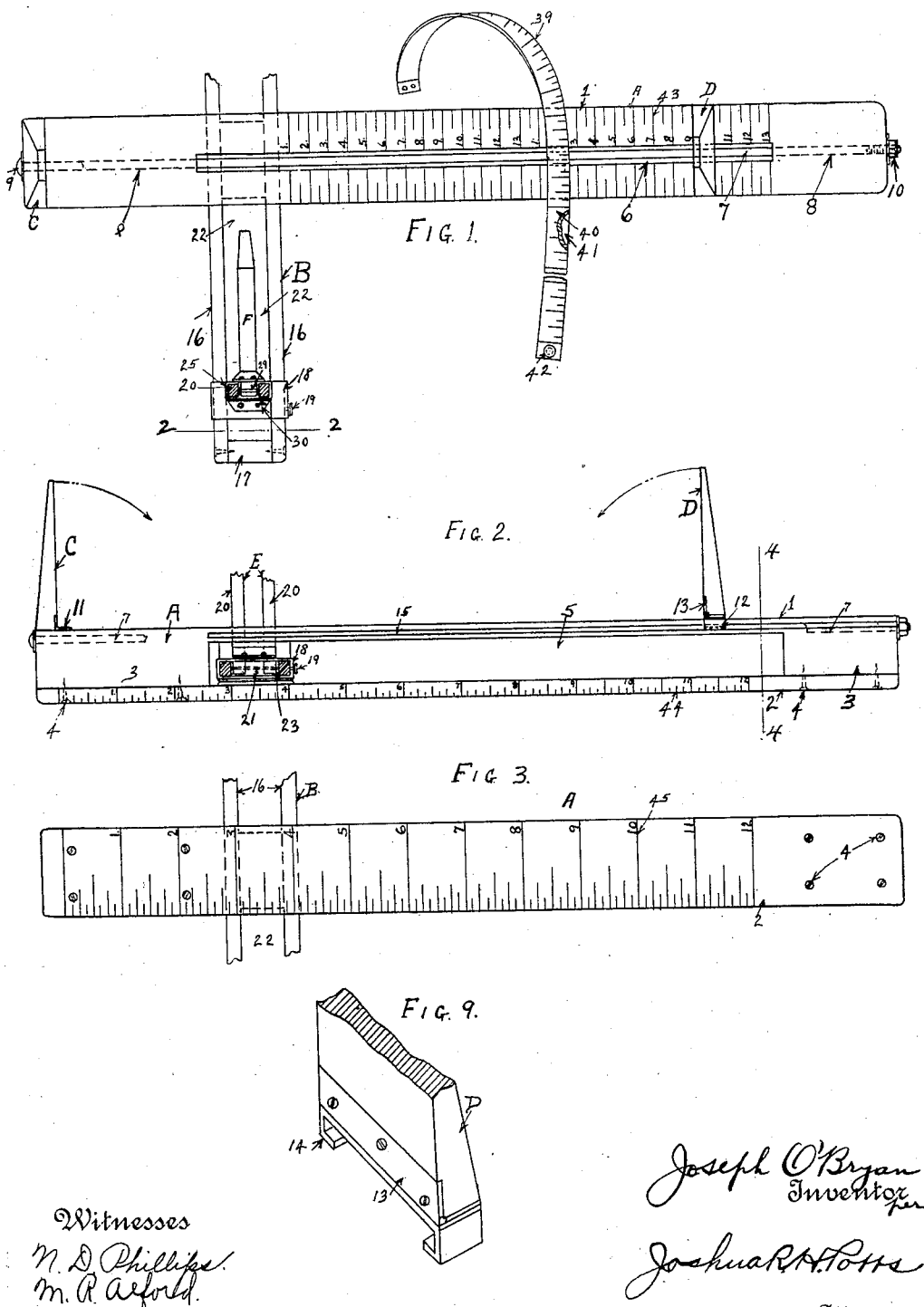

UNITED STATES PATENT OFFICE.

JOSEPH O'BRYAN, OF CHICAGO, ILLINOIS.

MEASURING-STICK.

No. 863,309.

Specification of Letters Patent.

Patented Aug. 13, 1907.

Application filed January 31, 1907. Serial No. 355,064.

*To all whom it may concern:*

Be it known that I, JOSEPH O'BRYAN, a citizen of the United States, residing at 783 Burling street, Chicago, in the county of Cook and State of Illinois, have invented certain new and useful Improvements in a Measuring-Stick, of which the following is a specification.

This present invention relates to foot measuring sticks adapted for use by makers of shoes for custom trade, by manufacturers, and merchants in general. It relates more particularly to a measuring stick of that type having a cross bar slidably mounted on the body or stick proper of the device, said cross bar and body being provided with adjustable uprights coöperating for enabling the length and width of the foot to be obtained with facility, and associated with the body of the device is a tape measure for ascertaining the circumference of the foot at various points.

The invention has for one of its objects to improve and simplify the construction and operation of measuring devices of this character so as to be comparatively easy and inexpensive to manufacture, convenient to adjust and manipulate, and thoroughly reliable and efficient in use.

A further object is to provide a measuring stick on which the cross bar is slidably and pivotally mounted so that the latter with its attached parts can be readily adjusted for obtaining the necessary measurements and folded into the body when not in use.

Another object of the invention is the provision of slidable indicator arms on one or both of the uprights of the cross bar for enabling the height of the foot to be obtained at any desired point.

A still further object is to provide a simple and convenient form of tape measure which is readily adjusted along the body of the device to measure the circumference of the foot.

With this object in view and others as will appear as the nature of the invention is better understood, the invention comprises the various novel features of construction and arrangement of parts which will be more fully described hereinafter and set forth with particularity in the claims appended hereto.

In the accompanying drawings which illustrate one of the embodiments of the invention: Figure 1 is a plan view of the measuring stick, one end of the cross bar broken away. Fig. 2 is a side elevation thereof with the cross bar in section on line 2—2, Fig. 1. Fig. 3 is a bottom plan view of the body of the measuring stick. Fig. 4, is a transverse section on line 4—4, Fig. 2. Fig. 5, is a fragmentary perspective view of one end of the cross bar and attached parts. Fig. 6 is a longitudinal section on line 6—6, Fig. 4. Fig. 7 is a fragmentary perspective view of one of the slides and turntable. Fig. 8 is a perspective view of one of the slides for supporting an indicator arm on its upright. Fig. 9 is a perspective view of the lower portion of the slidable upright on the body of the device.

Corresponding numerals are employed to indicate similar parts throughout the several figures of the drawing.

Referring to the drawing, A designates the body of the device, B the cross bar, C and D the uprights on the body, E the uprights on the cross bar, and F the indicator arms mounted on the last mentioned uprights.

The body A, consists preferably of two strips or plates, 1 and 2, of wood or other suitable material. The strip 1 is cut away intermediate its ends, thereby leaving the terminal portions 3, to which the plate or strip 2 is secured by screws 4. This cutaway portion of the member 1, coöperates with the member 2, to form a slot 5, extending longitudinally of the body A for accommodating the cross bar. Extending centrally of the member 1, is a slot 6, opening into the slot 5, and disposed lengthwise of the slot 6 is a guide rod 7, preferably of round cross section and extending at its ends through horizontal opening 8 bored in the portions 3 of the member 1, and having at one end a head 9, and at the opposite end a nut 10, for securely fastening the guide rod in the body A. The upright C, is hingedly mounted, by means of the fixed hinge 11, secured to the body A at one end. The upright D, which is slidable back and forth on the body A is attached to a slide 12, by means of a hinge 13. These hinges permit the uprights to be folded inwardly toward each other as indicated by the arrows Fig. 2, so as to lie flat against the top surface of the body A. The slide 12, is preferably a metal structure having its ends formed into opposed hooks 14, which engage in longitudinally extending grooves 15, provided in the side faces of the body A, as clearly shown in Figs. 2 and 4. These grooves extend inwardly from the right hand end of the body to any desired point. It will thus be seen that the adjustable upright D is free to slide along the body for the purpose of obtaining length of the foot. If desired, the said upright can be removed from the body by sliding it therefrom at the right hand end. The hinge 13, is attached directly to the slide 12 by rivets or other single fastening.

The cross bar B, comprises a strip of wood or other suitable material which is slotted inwardly from both ends, and the outer ends of the spaced members 16 thereof are connected by cross pieces 17. The cross bar extends transversely to the body A with its middle portion in the slot thereof. On each half of the cross bar is a slide 18 which carries one of the uprights E. This slide consists of a metal collar of rectangular section so as to fit the cross bar on which it moves, a clamping screw 19, being provided to secure the slide in adjusted position on the cross bar. The upright E is composed of two spaced members 20 that are hingedly connected to the slides 18 by the pintle 21. The lower ends of the members 20 extend between the members 16 of the cross bar so that the upright can be folded down into the slot 22, in the cross bar. The pintle 21, is secured in the lugs 23 on the slide 18. The upper ends of the members 20 of the upright E are spaced apart by a block 24, Fig. 5. Movable longitudinally of the uprights E are slides 25 on each one of which the indicator F is hingedly mounted. This slide is constructed on the same principle as the slides 18 on the cross bar B and is best illustrated in Fig. 8. The slide 25 is cut away at 26 for receiving the hinged end of the indicator F. At the cutaway portion are formed spaced apertured lugs 27 between which the indicator is confined and the apertures 28 are for the purpose of receiving the pintle 29, as shown in Fig. 1. Each indicator F is so mounted as to fold into the space between the members 20 of its respective upright E when it is desired to fold down the upright. Each slide 25 is held in adjusted position by a clamping screw 30, which binds at its inner end on one of the members 20 of the upright. The slides 18 and 25 are provided with rests 31 of angle-iron form riveted to their respective slide so as to hold the uprights in a vertical position and the indicator in a horizontal position as shown in Fig. 4. The combined slides and turn-table for the cross bar B, comprises a pair of spaced plates 32, which are connected together by a rivet 33, and between the plates is a turn-table 34, which turns about the rivet as a pivot. This turn-table is made of two parts 35 and 36, the first of which is cut away to receive the members 16 of the cross bar, and the turn-table is screwed to the cross bar by screws 37, countersunk in the part 36, and screwed into the members 16 of the cross bar, as shown in Figs. 6 and 7. By means of this turn-table the cross bar can swing around the pivot 33. On the top plate 32 are arranged upwardly extending bearings 38, in the form of eyes through which the guide rod 7 passes. These eyes permit the cross bar to be slid along the body A of the device so that the cross bar can be moved to any desired position with regard to the foot for permitting the uprights on the cross bar to be adjusted for ascertaining the width of the foot. By moving the cross bar so as to occupy a central position in the slot 5 the cross bar can be swung completely into said slot of the body. Before thus folding the cross bar into the body the indicator arms F are folded into the spaces or pockets between the members 20 of the uprights E. The uprights are then folded into the spaces or pockets between the members 16 of the cross bar. Obviously to fold the members in this manner the slides 18 must be at the ends of the cross bar and the slides 25 at the upper ends of the uprights.

For taking the circumferential measurements of the foot a tape measure 39 is employed. This tape measure comprises a flexible strip 40 having a suitable scale or division marks, and under the strip 40 is a second flexible strip 41 which is attached at its ends to the top strip and the bottom strip is of sufficient fullness to permit of its being doubled into the slot 6 of the body A and passed under the guide bar 7. By this means the tape measure is permanently attached to the measuring stick and the top strap 40 or tape measure proper can be used for correctly measuring the foot, since the same can be drawn snugly around and in contact with the foot at every point. The two strips of the tape measure can, if desired, be connected by means of a suitable fastening, such, for instance, as a fastener 42 of the type commonly used on gloves. This permits the strips 40 and 41 to be unfastened at one end so that the tape measure can be removed from the device if desired.

The various parts of the measuring stick are provided with suitable scales, as for instance, the top surface of the body A is provided with a scale 43 Fig. 1, for indicating the size or length of the foot. The under side of the body and if desired the side faces thereto are provided with linear scales 44 and 45, Figs. 2 and 3, in the denomination of inches. The uprights E are furnished each with a scale 46, Fig. 4, whereby the position of the indicator arm can be ascertained as in determining the height of the foot at the required points. On each half of the cross bar B is a scale 47, for indicating the width of the foot by the position of the uprights.

From the foregoing description in connection with the accompanying drawings, the advantages of the construction and the method of operation should be readily appreciated by those skilled in the art to which the invention appertains.

The device constructed as described enables a large variety of measurements to be taken, and the methods for taking some of these measurements will now be mentioned: First of all to ascertain the length of the foot, the foot is placed on the body A with the heel against the upright C. The adjustable upright D is then moved to touch the end of the large toe of the foot and the length is thereby indicated on the scale 43 in the usual manner. To ascertain the dimension of the ball of the foot the cross bar B is adjusted so as to aline with the ball and the uprights E are moved inwardly toward each other to touch the sides of the foot at the ball. The width of the ball is thus ascertained by the scales 47. By using one of the indicators F the height of the ball is determined, the indicator arm being lowered on its upright so as to come in contact with the top of the ball portion of the foot. The height of the ball will then be indicated by the scale 46. To ascertain the circumference of the foot at the ball the tape measure 39 is brought into alinement therewith by moving it along the body A and then drawing it snugly around the ball of the foot in the usual manner. By using the same methods just described the necessary measurements at the waist of the foot or other parts can be correctly obtained. The length of the shank of the foot, the depth, width, and circumference of the arch and other necessary measurements can be ascertained by the device as will be readily understood by persons accustomed to the use of ordinary measuring sticks.

I have described the principle of operation of the invention, together with the device which I now consider to be the best embodiment thereof, but I desire to have it understood that the device shown is merely illustrative, and that various changes may be made when desired, as are within the scope of the claims.

Having thus described my invention, what I claim is:

1. In a device of the class described, the combination of a body, an upright, a hinge connecting the latter to the body, a slide on the body, a second upright, a hinge connecting the second upright to the slide, the uprights being adapted to fold down against the body, a cross-bar foldably mounted on the body, and uprights foldably mounted on the cross-bar.

2. In a device of the class described, the combination of a body, uprights thereon, a slidable and pivotally mounted cross member on the body, and uprights on the member.

3. In a device of the class described, the combination of a body, foldable and relatively adjustable uprights thereon, an adjustable cross bar on the body, and foldable and adjustable uprights on the cross bar.

4. In a device of the class described, the combination of a body having a longitudinal slot, a cross bar mounted to fold into and out of the slot, and uprights for the cross bar.

5. In a device of the class described, the combination of a slotted body, a cross bar slidably and pivotally mounted in the slot to move bodily lengthwise thereof and to fold into and out of the same, and foldable uprights on the cross bar.

6. In a device of the class described, the combination of a body, a cross bar slidably and pivotally mounted thereon, uprights hingedly mounted on the cross bar, and members hingedly and slidably mounted on the uprights.

7. In a device of the class described, the combination of a body, a cross bar, a slidable mounting on the body for supporting the cross bar, a pivot for the cross bar, slides on the cross bar, uprights hingedly mounted on the slides, slides on the uprights, and indicator arms hingedly mounted on the last mentioned slides.

8. In a device of the class described, the combination of a body, a slidable and foldable cross bar thereon, uprights, slides on the cross bar, hinges connecting the uprights with the slides on the cross-bar, slides on the uprights arms hingedly connected with the slides last mentioned, means for clamping the slides respectively to the cross bar and uprights, and rests on the slides for holding the uprights and arm in operative position.

9. In a device of the class described, the combination of a body having a longitudinal slot, a guide rod therein, a cross bar, means thereon engaging the guide rod to permit the cross bar to slide, and uprights on the body and cross bar.

10. In a device of the class described, the combination of a body having a longitudinal slot, a guide rod therein, a cross bar, a turntable on which the cross bar turns, means connected with the turntable, and engaging the guide rod for adapting the cross bar to slide along the latter, and uprights on the body and cross bar.

11. In a device of the class described, the combination of a body having a main longitudinal slot extending from side to side and a secondary slot in the top and opening into the main slot, a cross bar extending through the main slot, a guide member extending longitudinally through the secondary slot, a turntable for supporting the cross bar in the main slot, and means secured to the turntable and engaging the guide member to permit the cross bar to be adjusted on the body.

12. In a device of the class described, the combination of a body, relatively adjustable uprights thereon mounted to fold down upon the body, an adjustable cross bar arranged to fold with respect to the body and having pockets at its ends, uprights slidable on the cross bar and foldable into the pockets thereof and being themselves provided with pockets, and indicator arms slidable on the uprights and folded into the pockets thereof.

13. In a device of the class described, the combination of a body, a tape measure, a flexible strip coextensive with the measure, and means on the body under which the strip of the measure extends and slides for adjustably holding the latter on the body.

14. In a device of the class described, the combination of a body, a rod thereon, a tape measure, and a flexible strip extending substantially the full length of the measure and connected with the ends of the latter, and engaging under the rod for movably connecting the measure to the latter.

15. In a device of the class described, the combination of a body having a slot, a guide member therein, a cross bar guided by said member, and a tape measure, said measure comprising a strip having a scale, and a second strip attached at its ends to the first and extending into the said slot and engaging around the guide member therein to hold the tape measure on the body.

In testimony whereof I have signed my name to this specification in the presence of the two subscribing witnesses.

JOSEPH O'BRYAN.

Witnesses:
HELEN F. LILLIS,
KATHRYN C. GREEN.